May 6, 1958     H. BRENDLEIN     2,833,808
TELOMERIZATION
Filed Jan. 11, 1957
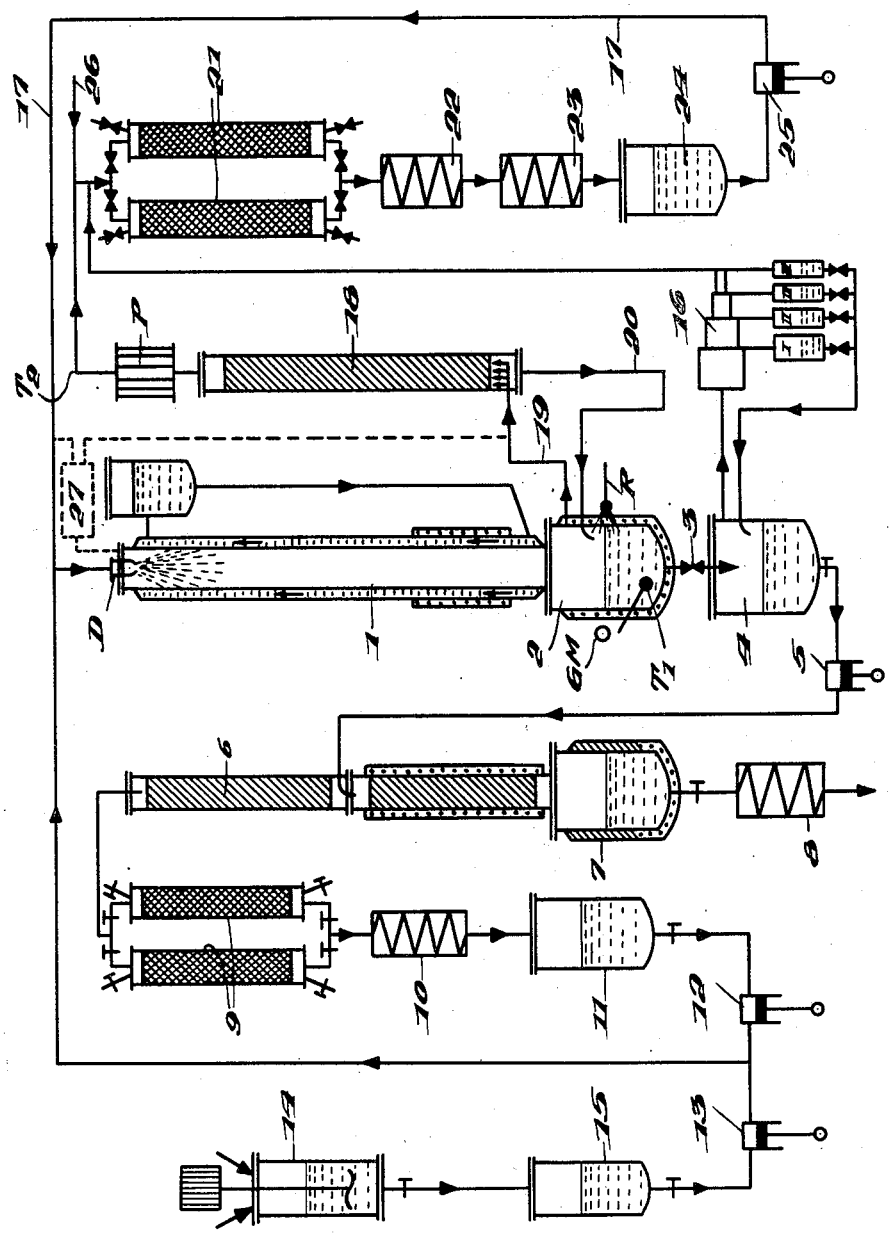
INVENTOR
HEINRICH BRENDLEIN,
BY Bailey, Stephens & Huettig
ATTORNEYS United States Patent Office 2,833,808
Patented May 6, 1958

2,833,808

TELOMERIZATION

Heinrich Brendlein, Hanau (Main) Hohe Tanne, Germany, assignor to Deutsche Gold- und Silber-Scheideanstalt vormals Roessler, Frankfurt am Main, Germany Application January 11, 1957, Serial No. 640,995

Claims priority, application Germany January 13, 1956

7 Claims. (Cl. 260—465.3)

The present invention relates to an improved method of carrying out telomerization reactions.

In telomerization reactions a polymerizable unsaturated compound (the taxogen) is reacted under polymerization conditions in the presence of radical forming catalysts or promotors with a so-called telogen. During the reaction, the telogen is split into radicals which attach to the ends of the polymerizing taxogen and in some instances add on to the double bond of the taxogen and thereby form chains whose terminal groups are formed of the radicals formed from the telogen.

Organic compounds containings an olefinic double bond, such as ethylene, propylene, hexene, octene or styrene, are normally employed as taxogens. Many different types of compounds can be employed as telogens, for example, halogenated hydrocarbons, such as chloroform or carbon tetrachloride, halogen derivatives of cyanogen, such as cyanogen chloride, aldehydes, alcohols and the like can serve as telogens.

Radical forming catalysts, such as organic peroxides, hydrogen peroxides, aliphatic azo compounds of the type of azo isobutyric acid nitrile, and redox systems are employed for telomerization reactions.

Telomerization reactions are as a rule carried out at an elevated temperature which lies between room temperature and 250° C. When volatile reactants are used the reaction is carried out under elevated pressures, for example, between 20 and 1000 atmospheres. Telomerization processes can be carried out continuously or discontinuously and the reactants, as well as the catalysts, can be supplied to the reaction zone or chamber separately or in the form of a mixture.

In telomerization reactions involving halogen containing telogens, free hydrohalide can be formed in side reactions which in some instances can disturb the course of the telomerization. The presence of the hydro-halide is detrimental in view of its corroding and condensing action. Therefore it has already been proposed to add hydrogen chloride absorbing substances to the reaction mixture. Epoxy compounds have been especially recommended as HCl-acceptors for this purpose. However, the addition of such materials to the reaction mixture in many instances promotes side reactions.

The present invention particularly relates to a process for the continuous production of telomerization produces by the addition of fragments of halogen containing telogens, especially cyanogen halides on the terminal grousp of olefins or polymerizing olefins in which an excess of olefin is recycled to the reaction zone. According to the invention the hydrohalide produced as a byproduct in the reaction is removed from the olefin recycled with the aid of substances, which under the reaction conditions, are inert both with respect to the telogen and with respect to the taxogen.

It was found that solid alkaline reacting substances, preferably calcium oxide, are particularly suited for the desired removal of the hydrohalide. Investigations have shown that completely dry calcium oxide is not as effective as calcium oxide in the presence of small quantities of moisture. It is consequently desirable to add small quantities of water or water vapor to the calcium oxide or to the recycling olefin.

It is expedient to cool the recycling olefin before the removal of the hydrohalic acid. The temperature to which it is cooled should be selected so that the olefin is not liquified at the pressure at which the hydrohalide absorption takes place. Furthermore, it has been found advantageous to remove the greater portion or all of the telogen still contained in the recycled olefin, for example, by cooling or scrubbing before the hydrohalide is removed therefrom. The recovered telogen can be returned to the reaction chamber by a special conduit.

The accompanying drawing diagrammatically shows an apparatus for carrying out the process according to the invention.

The following example illustrates a preferred modification of the process according to the invention with reference to the drawing.

*Example*

Cyanogen chloride together with azoisobutyric acid nitrile was sprayed in finest nebulized form into high pressure reaction tube 1 which was 2 meters long and had an interior diameter of 50 mm. The reaction tube was heated on the outside with recycled water under pressure to provide a reaction temperature of 160° C. The reaction pressure in the tube was 150 atmospheres gauge pressure and this pressure was maintained by appropriate introduction of fresh ethylene into the reaction system. High pressure sump 2 of about 4 liters capacity was flanged onto the lower end of reaction tube 1. The reaction product, namely, the chloronitriles of the general formula $Cl(CH_2—CH_2)_nCN$ produced from the cyanogen chloride and the ethylene as well as the nonreacted cyanogen chloride, collected in sump 2. The sump was electrically heated and the inner temperature was regulated to a constant of 120° C. with the aid of contact thermometer $T_1$. The heating of the sump was required in the semi-technical scale apparatus employed to compensate for heat radiation losses. In larger apparatus it is, on the other hand, necessary to cool the sump to maintain the desired temperature of about 100° or 120° C. therein. The level of the liquid within the sump was controlled in a known manner with the aid of gamma ray radiator R and a Geiger-Müller counter GM and maintained at a constant level with the aid of relief valve 3.

During a run lasting 77.7 hours, a total of 110.9 kg. of cyanogen chloride containing 1.25% of azoisobutyric acid nitrile as a catalyst were introduced into reaction tube 1 through nebulizer nozzle D. Consequently, the rate of introduction was 1.43 kg. of cyanogen chloride and 18 g. of azoisobutyric acid nitrile per hour. The decompression vessel 4 served to receive the reaction product and the unconverted cyanogen chloride as well as the ethylene set free from solution by the reduction in pressure from 150 atmospheres gauge pressure to atmospheric pressure.

The liquid products in vessel 4 which consisted of 45% of telomerization product and 55% of unconverted cyanogen chloride were supplied to about the middle of the continuously operating distillation column 6 with the aid of pump 5. The unconverted cyanogen chloride was separated from the telomerization product in such column. Retort 7 and the distillate outlet of the column were provided with heating. In view of the very wide separation of the boiling points of the cyanogen chloride and the lowest boiling chloronitrile produced (β-chloropropionitrile) it was not necessary to provide for a dephlegmation. The telomerization product was withdrawn from retort 7 over cooler 8 at a rate of 0.9 kg. per hour and then separated into the individual chloronitriles in another fractionating column (not shown). The cyanogen chloride which still contained small quantities of HCl leaving the head of column 6 was passed over one of absorption columns 9, then condensed in cooler 10 and supplied in liquid form to storage vessel 11. The absorption columns 9 were filled with calcium oxide lumps and were connected so that they could be used alternately. When the calcium oxide in one absorption column is covered with calcium chloride it can be regenerated by treatment with moist gases. As the HCl content of the cyanogen chloride was only about 0.08 to 0.2%, a regeneration of the absorption column would only be necessary after 300 hours or more of use.

1.1 kg. per hour of the liquid cyanogen chloride in vessel 11 was pumped out with the aid of high pressure pump 12 and was supplied with fresh catalyst containing cyanogen chloride from high pressure pump 13 to nebulizing nozzle D. The fresh catalyst containing cyanogen chloride was prepared in stirring vessel 14 and was supplied to pump 13 over vessel 15. Pump 13 supplied 0.33 kg. of cyanogen chloride containing 18 g. of dissolved azoisobutyric acid nitrile per hour to the nebulizing nozzle D.

The gaseous products from the decompression vessel 4, namely, ethylene and cyanogen chloride (the latter corresponding to its vapor pressure), were taken up by high pressure compressor 16 and compressed to the reaction pressure. During the compression the cyanogen chloride taken along by the ethylene separated out in the separatory vessels I to IV provided after each compression stage and was returned in liquid form to decompression vessel 4. The ethylene which still contained only very small quantities of cyanogen chloride was recycled over conduit 17 to the reaction system.

In order to achieve a greater flow of ethylene through the reaction tube 1 than would be provided necessarily by the quantity of ethylene used up in the synthesis of chloronitriles and the solution of ethylene in the liquid products produced, an arrangement was provided connected to the gas chamber of sump 2 to bleed off and recycle an additional quantity of ethylene. In this arrangement a pressure tube 18 was connected by conduit 19 with the gas chamber of sump 2 and therefore was subject to the reaction pressure of 150 atmospheres gauge pressure. A dephlegmator P was provided, the cooling water of which was regulated so that the effluent gas has a temperature of about 30–45° C. ($T_2$). The main quantity of cyanogen chloride condenses out in the dephlegmator and is returned to sump 2 over tube 18 and conduit 20. The gas leaving the dephlegmator at temperature $T_2$ primarily consisted of ethylene with small quantities of cyanogen chloride, but is contaminated with hydrogen chloride resulting from side reactions in reaction tube 1. The gas was then passed through one of the two alternately operating high pressure absorbers for HCl and liquified by cooling in cooler 22 to 15° C. and cooler 23 to 0° C. The liquified gas was then introduced into pressure vessel 24 from which it was recycled back to reaction tube 1 by pump 25 and conduit 17. The hydrogen chloride absorbers were filled with calcium oxide. The recycling of the ethylene can be regulated as desired by pump 25 but the upper limit depends upon the capacity of coolers 22 and 23. The reintroduction of the recycled ethylene into reaction tube 1 was effected through nozzle D through which the catalyst containing cyanogen chloride is introduced. However, if desired, such reintroduction can be effected directly into the reaction tube if a heat exchanger 27 (shown in dotted lines) is provided. In larger units it is expedient to introduce a portion of the cold recycled ethylene at those portions of the reaction tube 1 at which undesired temperature rises would occur through the exothermic reaction taking place therein.

In the run in question 6–7 kg. of ethylene and 0.3 to 0.5 kg. of cyanogen chloride uper hour were recycled by pump 25 and 0.64 kg. per hour of fresh ethylene were introduced into the system over conduit 26 from a high pressure ethylene storage container.

During the 77.7 hours' run 69.2 kg. of telomerization product were obtained. Upon vacuum rectification the following fractions were obtained:

| | | |
|---|---|---|
| $\beta$-chloro-propionitrile $Cl(CH_2)_2CN$ | B. P. 10 mm., Hg 55° C. | 3.11 kg. = 4.5% |
| $\delta$-chloro-n-valero-nitrile $Cl(CH_2)_4CN$ | B. P. 10 mm., Hg 92° C. | 17.64 kg. = 25.5% |
| $\omega$-chloro-n-enanthic acid nitrile $Cl(CH_2)_6CN$ | B. P. 1 mm., Hg 84° C. | 14.93 kg. = 21.6% |
| $\omega$-chloro-n-pelargonic acid nitrile $Cl(CH_2)_8CN$ | B. P. 1 mm., Hg 104° C. | 8.6 kg. = 12.4% |
| $\omega$-chloro-n-undecanoic acid nitrile $Cl(CH_2)_{10}CN$ | B. P. 1 mm., Hg 127° C. | 8.72 kg. = 12.6% |
| higher than $\omega$-chloro-n-undecanoic acid nitrile. | | 16.2 kg. = 23.4% |

I claim:

1. In a process for the production of telomerization products by reacting a halogen containing telogen with an olefinic taxogen in the presence of a radical forming catalyst in which non-reacted olefinic taxogen is recycled to the reaction zone, the step which comprises contacting the recycling olefinic taxogen outside of the reaction zone with calcium oxide to remove the hydrohalide formed as a by-product in the telomerization reaction.

2. The process of claim 1 in which the telogen is cyanogen chloride.

3. The process of claim 1 in which the removal of the hydrohalide is effected in the presence of moisture.

4. The process of claim 1 in which the olefin is cooled before removal of the hydrohalide.

5. The process of claim 1 in which the olefin is cooled before removal of the hydrohalide, said cooling being such that the recycled olefinic taxogen remains gaseous at the pressure at which the hydrohalide is removed.

6. The process of claim 1 in which the hydrohalide is removed at about the pressure of the telomerization reaction.

7. The process of claim 1 in which at least the major portion of the telogen carried along with the recycling olefinic taxogen is removed before removal of the hydrohalide.

References Cited in the file of this patent

UNITED STATES PATENTS 2,768,196    Huemer et al. _____ Oct. 23, 1956